(12) United States Patent  (10) Patent No.: US 7,032,619 B2
Gaenzle                    (45) Date of Patent:    Apr. 25, 2006

(54) SANITARY FITTING WITH SWIVELLING SPOUT

(75) Inventor: Fritz Gaenzle, Stuttgart (DE)

(73) Assignee: Hansa Metallwerke AG, (DE)

( * ) Notice: Subject to any disclaimer, the term of this patent is extended or adjusted under 35 U.S.C. 154(b) by 0 days.

(21) Appl. No.: 10/912,727

(22) Filed: Aug. 5, 2004

(65) Prior Publication Data
US 2005/0076963 A1    Apr. 14, 2005

(30) Foreign Application Priority Data
Aug. 13, 2003 (DE) .................. 103 37 223

(51) Int. Cl.
E03C 1/12 (2006.01)
(52) U.S. Cl. .................. 137/615; 137/801; 4/677
(58) Field of Classification Search .......... 137/615, 137/801; 4/675, 676, 677, 678
See application file for complete search history.

(56) References Cited

U.S. PATENT DOCUMENTS
5,301,715 A * 4/1994 Becker .................. 137/615
6,328,067 B1 * 12/2001 Hsiung .................. 137/615

FOREIGN PATENT DOCUMENTS
| DE | 7416418 | 10/1974 |
| DE | 2948474 C2 | 6/1981 |
| DE | 41 13 879 A1 | 11/1991 |
| EP | 0531318 | 5/1991 |
| EP | 496103 B1 | 12/1991 |
| WO | WO 96/30682 | 10/1996 |

* cited by examiner

Primary Examiner—Eric Keasel
Assistant Examiner—Craig Schneider
(74) Attorney, Agent, or Firm—Factor & Lake

(57) ABSTRACT

A guide ring of a sanitary spout fitting having a swivelling spout which can be fitted swivellably on a fitting body via a swivelling sleeve which forms part of the swivelling spout, has material projections on both cylindrical faces. Through these material projections the guide ring is in contact both with the inner cylindrical surface of the swivelling sleeve and with the outer cylindrical surface of the fitting body. The guide ring thus ensures good radial guidance of the swivelling sleeve of the swivelling spout on the fitting body. Because the guide ring can rotate with respect both to the swivelling sleeve and to the fitting body in the new state, the smooth running of the swivelling spout is preserved even if one of these rotation possibilities is obstructed.

9 Claims, 3 Drawing Sheets

SANITARY FITTING WITH SWIVELLING SPOUT

BACKGROUND OF THE ART

The invention relates to a sanitary fitting with a swivelling spout, comprising
a) a swivelling sleeve which forms part of the swivelling spout;
b) a fitting body on which the swivelling sleeve can be swivellably placed;
c) at least one guide ring serving as a bearing between the swivelling sleeve and the fitting body or a part connected thereto, which guide ring has on a cylindrical face material projections for guiding the swivelling sleeve radially without free play.

A sanitary fitting of this type is known from EP 0 496 103 B1. In that fitting the radial guidance of a swivelling sleeve of a swivelling spout which can be pushed into the fitting body is effected by two guide rings which have radially projecting, axially disposed parallel ribs on their cylindrical external faces oriented towards the swivelling sleeve. These ribs are made of a plastically deformable material and serve to guide the swivelling sleeve without free play. When the swivelling spout is swivelled the swivelling sleeve slides over the axial ribs of the guide rings, the rings normally not rotating with respect to the fitting body. If for any reason the swivelling sleeve can no longer slide freely over one of the guide rings and the latter is entrained with the swivelling movement, under unfavourable circumstances this can lead to an increase in the swivelling force required.

In the case of the subject of DE 29 48 472 C2 the radial guidance of the swivelling sleeve is also effected by two guide rings. To provide guidance without free play each ring is provided with expandable, elastic spring elements which are elastically compressed when the swivelling sleeve is pushed on to the fitting body. Such elastic spring elements can also yield when the swivelling arm is swivelled, which can give a user the impression that the radial guidance means do not have an exact fit, which is frequently associated with inferior quality. In addition, such spring elements are very complicated components, the manufacture of which is relatively complex and therefore costly.

EP 0 531 318 B1 describes an L-shaped bearing ring on which the swivelling sleeve rests but which has no radially extending material projections. However, a continuous fixing ring has axial ribs on both cylindrical faces. These, however, are locking lugs which serve to locate a covering cap in a stationary position on the fitting body. When swivelled, the swivelling sleeve rotates around a smooth continuous surface of this fixing ring. The contact area is very large, whereby relatively large frictional forces again arise.

It is an object of the present invention to configure a sanitary fitting of the above-mentioned type that, in addition to guidance which is free of play, a smooth-running swivelling movement of the swivelling spout is ensured.

This object is achieved according to the invention in that:
d) material projections are also provided on the second cylindrical face of the guide ring.

According to the invention, the frictional forces arising when the swivelling arm is swivelled are reduced especially in the case when the swivelling sleeve, on being swivelled, does not slide over the guide ring but entrains the latter. In this case the material projections arranged on the other cylindrical face of the guide ring come into operation, making possible smooth-running swivelling of the guide ring with respect to the fitting body.

It is especially advantageous if the material projections, and preferably the entire guide ring, are/is manufactured from a plastics material having good sliding properties. This additionally reduces the frictional forces.

The material projections of the guide ring may be ribs. It is advantageous if these ribs are disposed axially and parallel, since in this case simple and low-cost manufacture is ensured. Alternatively, discrete bosses may be provided.

Good radial guidance is achieved if the guide ring has a substantially rectangular cross-section.

It is advantageous if the guide ring has an additional, radially projecting flange. The swivelling sleeve can rest axially on and slide with respect to said flange, whereby the guide ring provides both a radial and an axial bearing.

Especially good guidance is achieved if at least one guide ring serving as a radial bearing and at least one guide ring serving as a radial and axial bearing are provided and the guide rings are spaced axially from one another.

BRIEF DESCRIPTION OF THE DRAWINGS

An embodiment of the invention is elucidated below with reference to the drawings, in which.

DETAILED DESCRIPTION OF THE DRAWINGS

Figure 1:
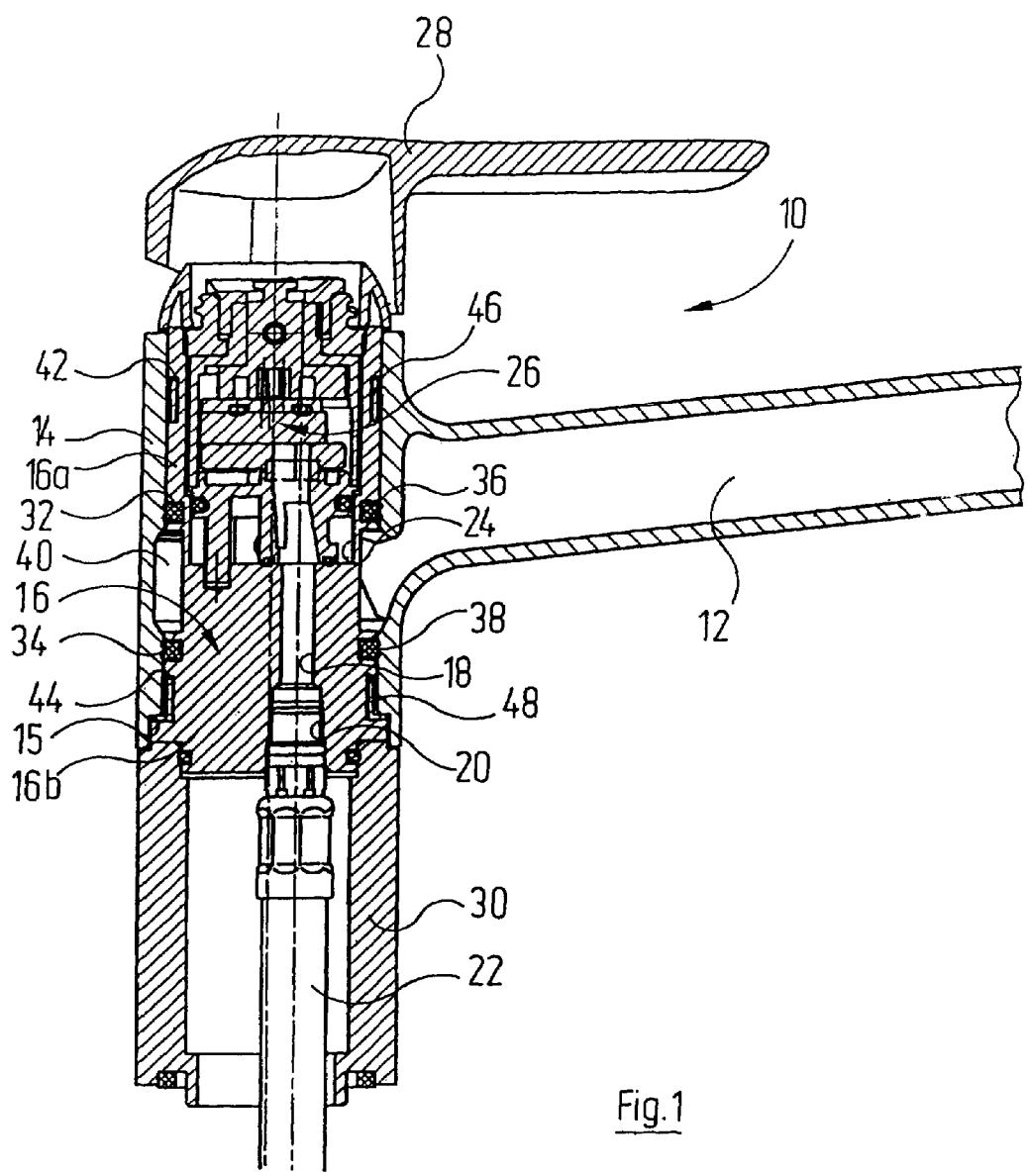
FIG. 1 shows an axial section of a sanitary fitting with swivelling spout.

A sanitary fitting 10 is illustrated in FIG. 1. It has a swivelling spout 12 which includes a swivelling sleeve 14.

The swivelling sleeve 14 has at its lower end a larger internal diameter than the portion located directly thereabove, producing a circumferential step 15. This will be explained more fully below.

The swivelling sleeve 14 is placed on a fitting body 16. The fitting body 16 has a bore 24, so that a hollow-cylindrical upper section 16a of the fitting body 16 is produced. This section 16a serves to receive a cartridge 26 which contains the water-controlling elements and is adjustable via the lever 28. The cartridge 26 has in known fashion on its underside two water inlets and a mixed-water outlet.

The lower section 16b of the fitting body 16 has passing through it two water supply passages and a connecting passage, only one water supply passage 18 being visible in FIG. 1.

A supply pipe 22 is fitted in conventional fashion to an outer fixing section 20 of each of the water supply passages 18 by means of a threaded connection with rubber sealing ring.

The above-mentioned water supply inlets of the cartridge 26 communicate with the water supply inlets 18 in the fitting body 16. The mixed-water outlet of the cartridge 26 is connected to the interior of the swivelling spout 12 via the above-mentioned connecting passage in the fitting body 16, an annular cavity 40 being located between the fitting body 16 and the swivelling sleeve 14.

The fitting body 16 is seated on a hollow-cylindrical seating part 30, which serves to mount the sanitary fitting 10 on, for example, a sink unit.

The fitting body 16 has on its outer cylindrical face two circumferential grooves 32, 34 which each receive a respective O-ring seal 36, 38. The grooves 32, 34 and the O-rings 36, 38 are arranged respectively above and below the water-conducting annular cavity 40.

In addition, the fitting body 16 includes in its outer cylindrical surface two circumferential recesses 42, 44 which serve to receive guide rings 46, 48, which will be described in more detail below.

Figure 2:
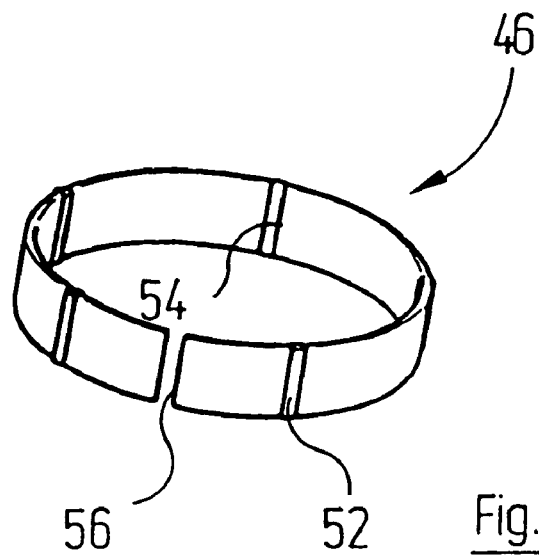
FIG. 2 is a perspective view of a guide ring serving as a radial bearing.
Figure 3:
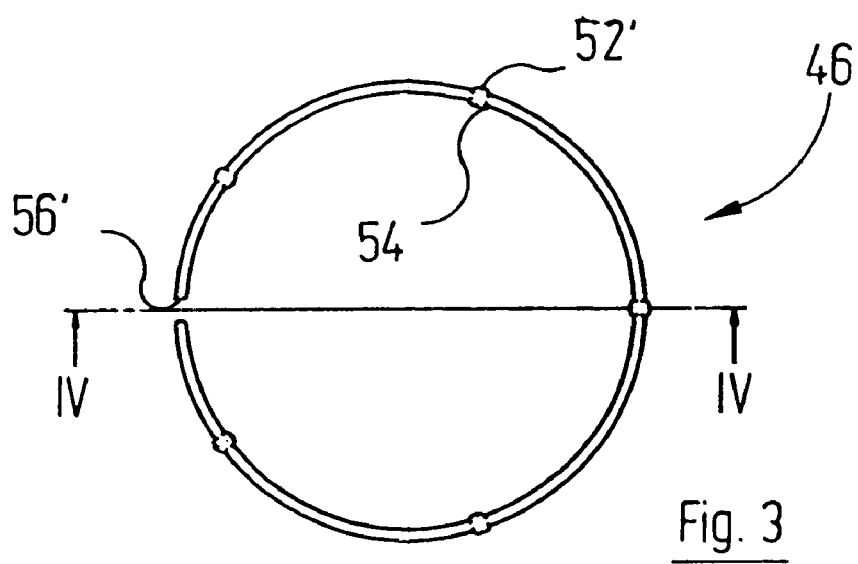
FIG. 3 is a top view of the guide ring of FIG. 2.
Figure 4:
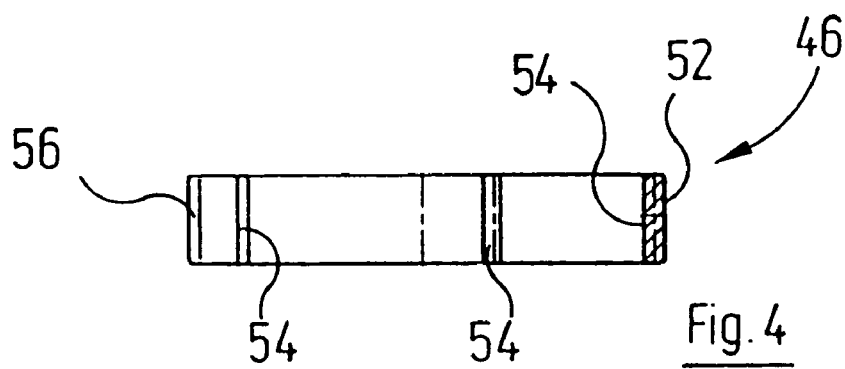
FIG. 4 shows a section along the line IV—IV of FIG. 3.

Reference is made first to FIGS. 2 to 4 which show the upper guide ring 46 in a perspective view, in a top view and in cross-section respectively.

The guide ring 46 has on both its external and internal cylindrical faces material projections in the form of five respective radially projecting, axially disposed parallel ribs 52, 54 on each face.

The guide ring 46 including the material projections 52, 54 is an injection-moulded part and is made of a plastics material having good sliding properties.

The guide ring 46 has a radial slit 56 so that it can be expanded somewhat for fitting to the fitting body 16. The cross-section of the ring 46 corresponds substantially to a rectangle, as can be seen in FIG. 4.

Figure 5:
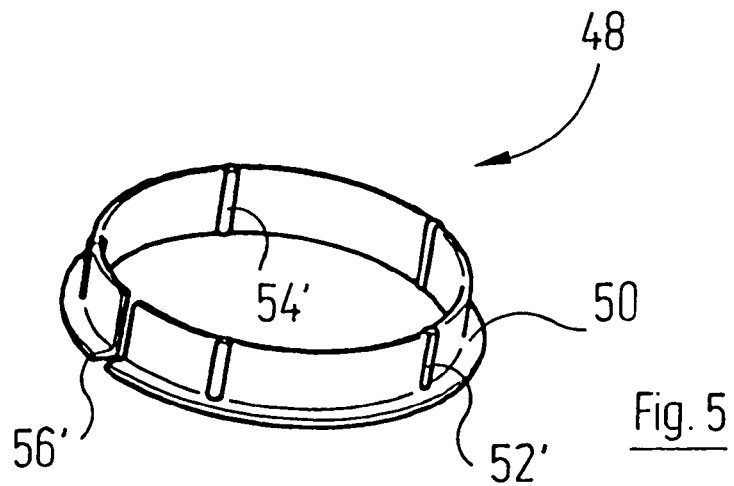
FIG. 5 is a perspective view of a guide ring which serves as both an axial and a radial bearing.
Figure 6:
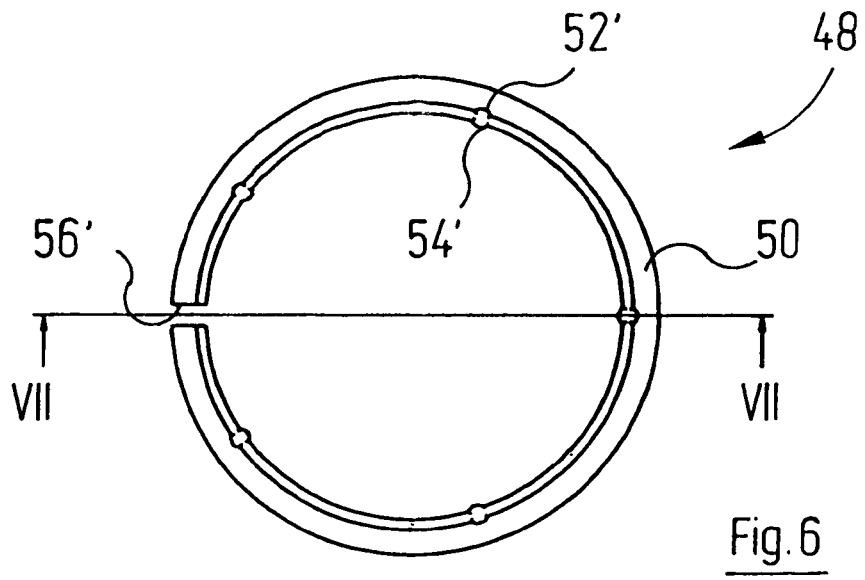
FIG. 6 is a top view of the guide ring of FIG. 5.
Figure 7:
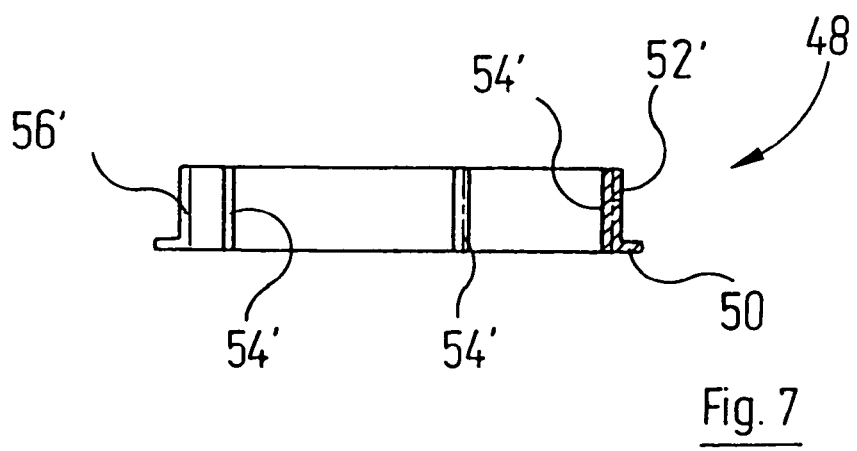
FIG. 7 shows a section along the line VII—VII of FIG. 6.

FIGS. 5 to 7 show the lower guide ring 48 in a perspective view, in a top view and in cross-section respectively. The guide ring 48 has a radially projecting circumferential flange 50, producing an L-shaped cross-section, as can be seen in FIG. 7. Otherwise the guide ring 48 includes the same elements as the guide ring 46. These elements are denoted in FIGS. 5 to 7 by the same reference numerals as in FIGS. 2 to 4, with an added apostrophe. The guide ring 48 possesses all the properties and characteristics described above with reference to guide ring 46.

If the swivelling sleeve 14 is now placed on the fitting body 16, its internal cylindrical surface bears against the O-rings 36, 38. Through the contact with the latter the cavity between the internal cylindrical surface of the swivelling sleeve 14 and the fitting body 16 is sealed above and below the annular cavity 40. Water is thereby prevented from escaping from the annular cavity 40 into the zones between the internal cylindrical surface of the swivelling sleeve 14 and the sections 16a and 16b of the fitting body.

The diameters of the guide rings 46, 48 and the heights of the ribs 52, 52', 54, 54' are so dimensioned as to ensure that the inner axial ribs 54, 54' remain completely in linear contact with the cylindrical faces of the recesses 42, 44, and the outer ribs 52, 52' bear against the internal cylindrical surface of the spout sleeve 14.

The guide rings 46, 48 form radial bearings which guide the spout sleeve 14 substantially coaxially with the fitting body 16. They make possible a seating of the swivelling sleeve 14 on the fitting body 16 which is without free play and compensate for tolerances when the swivelling spout 12 is swivelled. In addition, they make possible very smooth-running swivelling of the swivelling spout 12.

Because of the axial ribs 52, 52', 54, 54' on both cylindrical faces of the guide rings 46, 48 the sliding surfaces of the swivelling sleeve 14 which rotates relative to the fitting body 16 are very small. In addition, it makes no difference whether the swivelling sleeve 14 slides over the outer ribs 52, 52' of the guide rings 46, 48 or whether the guide rings 46, 48 rotate with the swivelling sleeve 14 and the inner ribs 54, 54' then slide over the outer cylindrical surface of the fitting body 16. There are therefore two possibilities by which the swivelling sleeve 14 can swivel smoothly with respect to the fitting body 16. If one of these possibilities is eliminated—for example by contamination—the other possibility nevertheless ensures the smooth running of the swivelling spout 12.

As can be seen from FIG. 1, the lower guide ring 48 is located in the recess 44 at the lower end of the fitting body 16. The step 15 of the swivelling sleeve 14 is seated on the flange 50 of the guide ring 48. The step 15 of the swivelling sleeve 14 therefore slides on the flange 50 of the guide ring 48 when the swivelling spout 12 is swivelled. Said flange 50 therefore additionally provides an axial bearing.

While specific embodiments have been illustrated and described herein, numerous modifications may come to mind without significantly departing from the spirit of the invention, and the scope of protection is only limited by the scope of the accompanying Claims.

What is claimed is:

1. Sanitary fitting with swivelling spout, comprising a) a swivelling sleeve which forms part of the swivelling spout; b) a fitting body on which the swivelling sleeve can be swivellably placed; c) at least one guide ring serving as a bearing between the swivelling sleeve and one of the fitting body or a part connected thereto, which the at least one guide ring has on a first cylindrical face material projections for guiding the swivelling sleeve radially without free play characterised in that: d) material projections are also provided on a second cylindrical face of the guide ring, and wherein the swivelling sleeve, when moved, is able to move relative to the at least one guide ring as well as together with at least one guide ring, relative to the fitting body.

2. Sanitary fitting according to claim 1, characterised in that the material projections, and preferably the entire guide ring, are made of slidable material.

3. Sanitary fitting according to claim 1, characterised in that the material projections are ribs.

4. Sanitary fitting according to claim 3, characterised in that the ribs are disposed axially.

5. Sanitary fitting according to claim 1, characterised in that the material projections are discrete bosses.

6. Sanitary fitting according to claim 4, characterised in that the at least one guide ring has a radial slit.

7. Sanitary fitting according to claim 6, characterised in that the at least one guide ring has a substantially rectangular cross-section.

8. Sanitary fitting according to claim 6, characterised in that the at least one guide ring has a radially projecting flange which serves as both a radial and an axial bearing.

9. Sanitary fitting according to claim 7, characterised in that the at least one guide ring includes a first guide ring which serves as a radial bearing and a second guide ring which serves as a radial and axial bearing, the first and second guide rings being spaced axially from one another.

* * * * *